United States Patent [19]

Trommler et al.

[11] Patent Number: 4,958,520
[45] Date of Patent: Sep. 25, 1990

[54] DIGITAL PIEZORESISTIVE PRESSURE TRANSDUCER

[75] Inventors: Craig S. Trommler, Romoland; Mark D. Finefrock, Riverside, both of Calif.

[73] Assignee: Bourns Instruments, Inc., Riverside, Calif.

[21] Appl. No.: 431,366

[22] Filed: Nov. 1, 1989

[51] Int. Cl.$^5$ ............................ G01L 7/08; G01L 9/06
[52] U.S. Cl. ........................................ 73/727; 73/721; 338/4; 364/558
[58] Field of Search .................. 73/727, 721, 754, 726, 73/720, DIG. 4, 4 R, 708; 338/4; 364/558

[56] References Cited

U.S. PATENT DOCUMENTS

| | | | |
|---|---|---|---|
| 4,163,396 | 8/1979 | Waugh | 73/721 |
| 4,449,409 | 5/1984 | Antonazzi | 73/724 |
| 4,667,516 | 5/1987 | Schulz | 73/708 |
| 4,765,188 | 8/1988 | Krechmery | 73/708 |
| 4,817,022 | 3/1989 | Jornod et al. | 73/4 R |

FOREIGN PATENT DOCUMENTS 0193827 6/1987 Japan ............................ 73/727

OTHER PUBLICATIONS

"Linear and Conversion Applications Handbook", (PMI 1986), p. 88, FIG. 9.
"Linear and Conversation Applications Handbook", (PMI 1986), p. 106, FIG. 15.

Primary Examiner—Donald O. Woodiel
Attorney, Agent, or Firm—Howard J. Klein; William G. Becker

[57] ABSTRACT

In a digital transducer, the output of a piezoelectric transducer bridge is coupled to the input of a comparator whose output switches between two predetermined states. A series of digital values is generated in response to the state of the comparator output and is fed back to balance the bridge. Stored digital values control the span of the transducer.

8 Claims, 3 Drawing Sheets

DIGITAL PIEZORESISTIVE PRESSURE TRANSDUCER

BACKGROUND OF THE INVENTION

1. Field of the Invention

The present invention generally relates to pressure transducers, and more particularly to an improved digital piezoresistive transducer in which stored digital data establishes and can be used to dynamically change the span of the transducer.

2. Description of the Prior Art

One class of pressure transducer, which is well known and widely used in industry, employs a number of piezoresistive strain responsive elements epitaxially formed on a semiconductor substrate with the piezoresistive elements interconnected in a bridge configuration. A pressure on the substrate unbalances the bridge, and the magnitude of the unbalance is a measure of the applied pressure.

In one widely used type of prior art transducer, the output terminals of the bridge are coupled to the input of an instrumentation amplifier, whose analog output voltage is a function of the magnitude of the differential input to the amplifier from the bridge. U.S. Pat. No. 4,765,188 ('188) issued to Roger Krechmery and Mark Finefrock and assigned to the assignee of this invention is an example of a prior art piezoresistive pressure transducer. In such transducers, an analog to digital convertor is used to convert the instrumentation amplifier output to a digital value.

While this type of prior art piezoresistive pressure transducers are generally satisfactory and are widely used, they have limitations. These limitations include a tendency of the instrumentation amplifier output and the bridge power supply output to drift, particularly in high temperature environments, degrading the accuracy of the transducer. Further, in these prior art transducers the span of the transducer cannot be readily adjusted over a wide range, or dynamically changed. Proposals have been made in the prior art to eliminate the instrumentation amplifier in bridge circuits generally by using a comparator and placing the bridge in the analog to digital feedback loop. But these proposals do not provide digital control of the transducer span and thus would require tight control of the manufacturing process for piezoresistive transducers. Further, there is no provision for dynamic range change.

SUMMARY OF THE INVENTION

It is therefore an object of this invention to provide an improved piezoresistive pressure transducer which is relatively immune to component drift and in which the zero point and span can be readily and dynamically changed over a wide range.

Briefly, this invention contemplates the provision of a transducer in which the piezoresistive bridge is in the feedback loop of the process which converts the bridge analog output to a digital value. The bridge is driven to balance as a concomitant operation in the conversion process. Span and zero data are stored digitally. A digital to analog converter couples selected zero data to the bridge. Selected span data controls the sensitivity of the rebalance feedback loop.

DETAILED DESCRIPTION OF THE PREFERRED EMBODIMENT OF THE INVENTION

Figure 1:
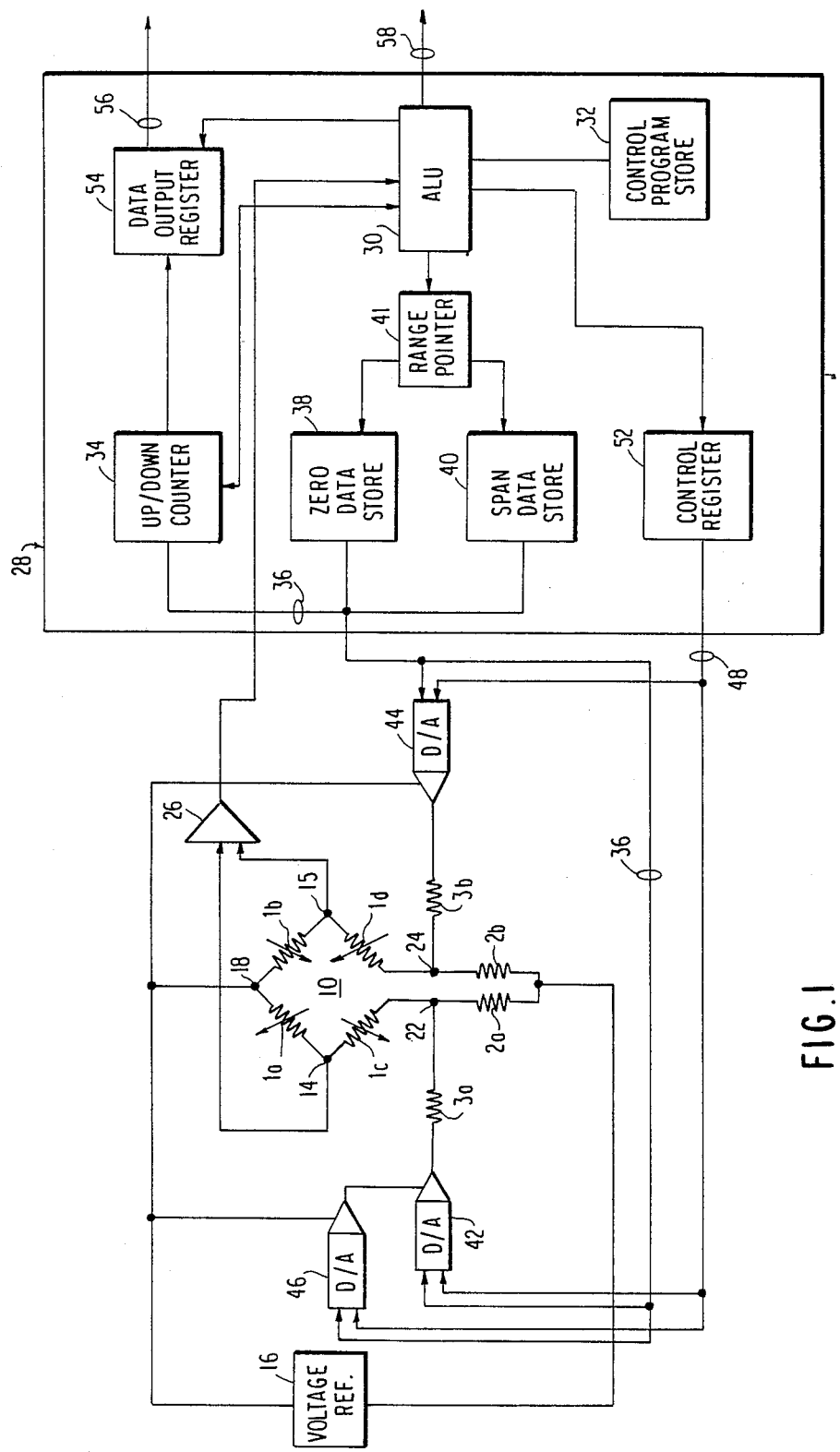
FIG. 1 is a diagram, partially in block form and partially in schematic form, of a piezoresistive transducer in accordance with the teachings of this invention.

Referring now to the drawings, the same reference numeral indicates the same element in the various figures. In FIG. 1 a piezoresistive pressure transducer includes a bridge denoted by the general reference numeral 10 comprised of four strain sensitive piezoresistive elements 1a, 1b, 1c, and 1d. As will be appreciated by those skilled in the art, the elements 1a and 1d are so oriented on the semiconductor substrate that an applied pressure on the substrate causes a stress induced change in resistance of each element of substantially the same magnitude and in the same direction, that is; in direction of increasing or decreasing magnitude. Similarly, the resistance of elements 1b and 1c change by the same amount but in the opposite direction to the direction of change of elements 1a and 1b. Thus, a pressure on the substrate causes the bridge to become unbalanced, generating a potential difference between an output terminal 14 and an output terminal 15. The magnitude of the imbalance is a function of the applied pressure to be measured.

One side of a voltage reference power supply 16 is coupled to an input terminal 18 of the bridge 10 and the other side of the power supply 16 is coupled to bridge input terminals 22 and 24 via series resistors 2a and 2b respectively. Resistors 2a and 2b are not piezoresistive elements and should not appreciably change their resistance value with pressure. They may, however, be formed integrally in the semiconductor substrate.

The bridge output terminals 14 and 15 are dc coupled as inputs to an operation amplifier 26 operating as an analog comparator which has a two state output; one characteristic state when the potential of terminal 14 exceeds that of 15, another characteristic state when the potential of terminal 14 is less than that of terminal 15. For example, the output values may be plus fifteen volts and minus fifteen volts.

The output of comparator 26 is coupled to an input of a controller indicated by the general reference numeral 28. Controller 28 functions to generate a digital value indicative of applied pressure by a process which includes feeding back to the bridge a series of digital values to drive the bridge to balance. In addition, controller 28 serves to change the span and zero set point of the bridge, either on command or automatically with changing applied pressure.

The controller 28 may employ either hard wire or programmable logic. A microprocessor based, programmable logic implementation is illustrated here. The controller 28 includes an arithmetic and logic unit (ALU) 30 and a program control store 32 coupled thereto. The output of the comparator 26 is coupled to the ALU 30 and under program control the ALU 30 causes an up-down counter 34 to increment through successive digital values so long as the output of comparator 26 indicates an unbalance condition between bridge output terminals 14 and 15.

The controller 28 includes a zero data store 38, a span data store 40 and a range pointer 41 coupled to the zero data store and span data store 38 and 40, respectively. A data output bus 36 couples the up-down counter 34 to a rebalance feedback digital to analog converter 42, the zero data store 38 to a zero control digital to analog converter 44, and the span data store 40 to a span control digital to analog converter 46.

A bus 48 couples the output of a control store register 52 to the converters 42, 44 and 46 so that in response to a write command from ALU 30 the data on bus 36 from the counter 34, the zero data store 38 and the span data store 40 is written into the appropriate analog to digital converter 42, 44 and 46, respectively.

A fixed resistor 3a couples the analog output of feedback converter 42 to the input terminal 22 of bridge 10. Similarly, a fixed resistor 3b couples the analog output of zero control converter 44 to bridge input terminal 24. Resistors 3a and 3b may be formed similarly to resistors 2a and 2b and their resistance should not change appreciably with pressure. The analog output of span control converter 46 is coupled to feedback converter 42 and establishes the reference potential for feedback converter 42. Voltage reference 16 establishes the reference potential for zero converter 44 and span converter 46.

In operation, the analog output of feedback converter 42 is a function of the digital value coupled to its input from the up-down counter 34 and the reference potential established by the span data via converter 46. As the output potential of converter 42 changes incrementally upwardly or downwardly, the potential of terminal 14 relative to terminal 15 is driven upwardly or downwardly, driving the bridge to balance. The magnitude of the analog change for each incremental change of the counter is a function of the reference potential established by span converter 46. Changing the span data changes the sensitivity of the feedback loop and thus changes span of the transducer. A change in zero data changes the potential of terminal 15 relative to terminal 14 and thus changes the pressure at which the bridge will balance.

Up-down counter 34 is also coupled to an output data register 54 which stores the count from counter 42 and couples to an output data bus 56 upon receipt of an output from ALU 30 indicating the conversion process is complete.

Figure 2:
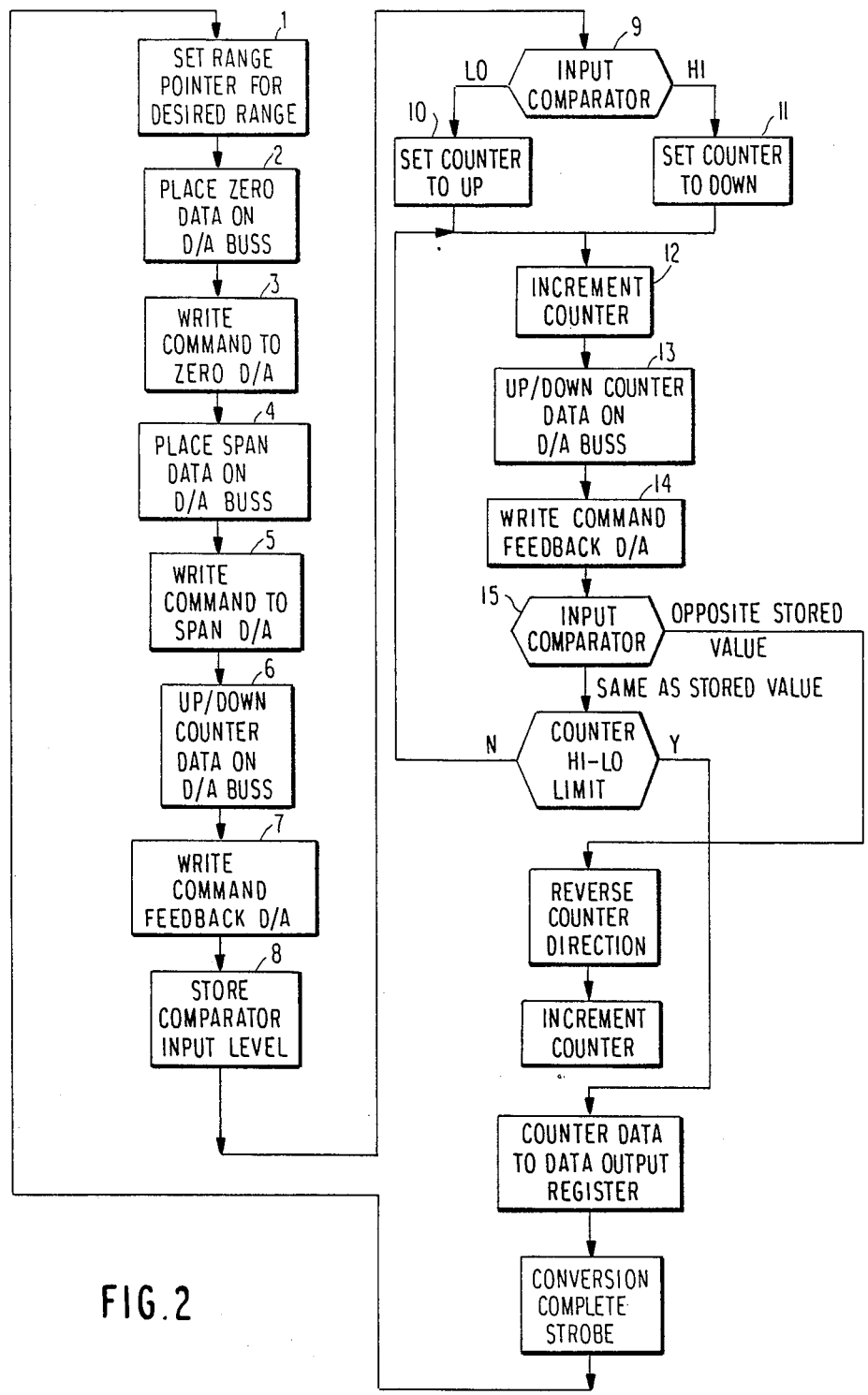
FIG. 2 is a flow diagram illustrating the operation of the control unit shown in FIG. 1.

Referring now to FIG. 2 in addition to FIG. 1, the sequence of operation is as follows. As indicated at block 1, in response to an output from ALU 30, range pointer 41 addresses the data stored in zero data store 38 and span data store 40 corresponding to a desired range. Here it should be noted, the data in zero store 38 and in span store 40 may be advantageously determined empirically and determined in pairs. That is, a zero data and span data value are determined for each desired range. For example, the appropriate zero and span data would be determined empirically for full scale operation over a range of 50 psi to 60 psi by applying a known pressure to the transducers. A data pair is determined empirically for each range of interest; e.g., 50–70 psi; 30–70 psi, etc. The range pointer 41 addresses pairs of data to provide appropriate bridge zero and span inputs for the range selected.

The selected zero data from store 38 is placed on bus 36 and an output from control register 52 on bus 48 couples this data to zero converter 42. Similarly, span data from store 40 is placed on bus 36 and written into span converter 46 in response to an output from control register 52 on bus 48.

As indicated in block 6, the digital value of up-down counter 34 is placed on the bus 36 and in block 7 it is written into the feedback converter 42 in response to an output from register 58 on bus 48.

As indicated in block 8, the ALU 30 stores the input level (i.e., high or low) from comparator 26 and, as indicated in block 9, tests to see if the comparator output is high or low (e.g. +15 or −15 volts). As a result of this comparison the counter 34 is set to increment upwardly or downwardly and after being set is incremented as indicated in block 12. The digital value of the counter 34 is again placed on the data bus 36 and coupled to the feedback converter 46 in response to a write command on bus 48.

At step 15 the ALU 30 again examines the output of comparator 26 and compares it to the level stored at step 8. If there has been no change compared to the stored value, the operation loops back to step 12 and the up-down counter 34 is again incremented and its output coupled to converter 32. If the input from comparator 26 is opposite the stored value, the counter direction is reversed at 17, incremented at 18 and the ALU transfers the counter data to the output data register 54 in block 19 and generates a strobe output on a conversion complete output line 58.

Figure 3:
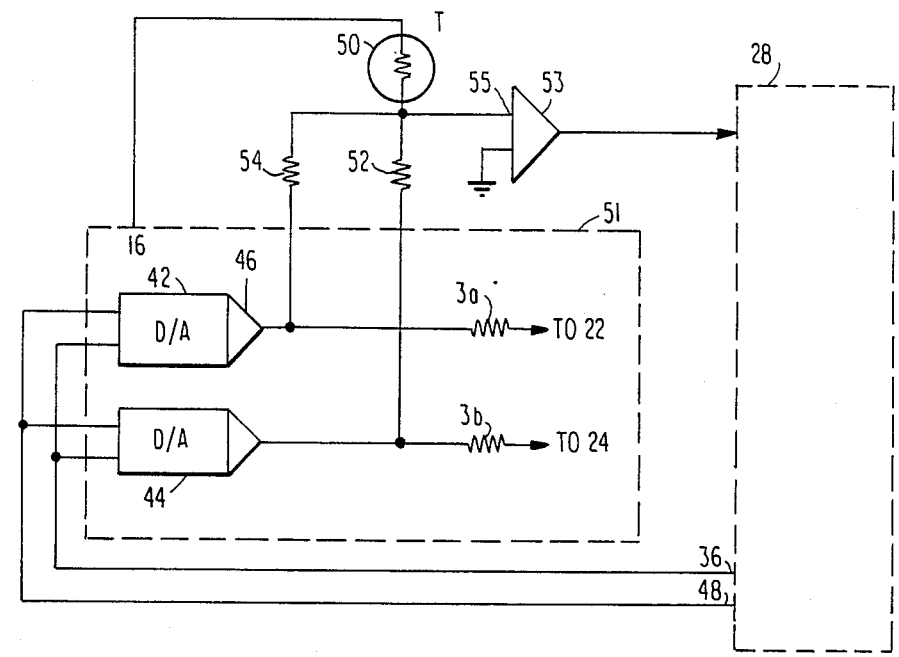
FIG. 3 is a diagram similar to FIG. 1 showing the transducer of FIG. 1 with thermal compensation.

Referring now to FIG. 3, temperature compensation may be obtained by the addition of a temperature compensating resistor 50 to the system of FIG. 1. One side of temperature responsive resistor 50 is coupled to one side of the direct current reference supply 16 and the other side is direct current coupled to one input 55 of a comparator 53. Resistors 52 and 54 respectively couple the outputs of feedback converter 42 and zero converter 44 to comparator 55. The other input to converter 53 is coupled to the other side of reference supply 16. While separate components could be used, it is advantageous to multiplex the operation and use one set of components. The output of bridge 10 is ignored while temperature information is determined and the output of resistor 50 is ignored when pressure information is determined.

Controller 28 converts the two state output of comparator 53 to a series of digital values which are fed back to the input of comparator 53 via converter 42 and resistor 54 in order to drive the comparator input to balance. Temperature information thusly determined may be used to compensate for temperature induced changes in the output of bridge 10 downstream of controller 28 using suitable prior art compensation procedures.

Thus, it will be appreciated the objects of the invention are accomplished. The system is relatively immune to error as a result of component drift and reference supply drift and the range of the transducer may be dynamically changed by means of the stored span and zero point data.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A piezoresistive transducer comprising in combination, a bridge circuit with a pressure responsive piezoresistive element in at least one arm of said bridge, said bridge having a pair of output terminals;
a comparator having an input and an output;
means coupling said bridge output terminals to said comparator input;
said comparator output having one characteristic state when the potential of one bridge terminal is greater than the other and another characteristic state when it is less than that of the other;
means responsive to said comparator output to generate a series of digital values;
feedback means for coupling said digital values to said bridge to drive said bridge to balance;
means to store a set of digital values to establish a span for said transducer; and
means for coupling said stored digital values to said feedback means.

2. A transducer comprising in combination,
a bridge circuit, said bridge having a pair of output terminals;
a comparator having an input and an output;
means coupling said bridge output terminals to said comparator input;
said comparator output having one characteristic state when the potential of one bridge terminal is greater than the other and another characteristic state when it is less than that of the other;
means responsive to said comparator output to generate a series of digital values;
feedback means for coupling said digital values to said bridge to drive said bridge to balance;
means to store a set of digital values to establish a span for said transducer; and
means for coupling said stored digital values to said feedback means.

3. A piezoresistive transducer comprising in combination,
a bridge circuit with a pressure responsive piezoresistive element in at least one arm of said bridge, said bridge having a pair of output terminals;
a comparator having an input and an output;
means coupling said bridge output terminals to said comparator input;
said comparator output having one characteristic state when the potential of one bridge terminal is greater than the other and another characteristic state when it is less than that of the other;
means responsive to said comparator output to generate a series of digital values;
feedback means for coupling said digital values to said bridge to drive said bridge to balance, said feedback means including a feedback digital to analog converter;
said feedback converter having a reference potential input the magnitude of which determines the magnitude of incremental change in analog output for an incremental change in digital input;
means to store a set of digital values for establishing a zero point for said transducer;
means to store a set of digital values for establishing a span for said transducer;
means including a digital to analog converter to couple zero point values to said bridge to establish a potential of one of said bridge output terminals relative to the potential of the other;
means including a digital to analog converter to couple said span values to said feedback converter reference potential input to establish an incremental change in analog output of said feedback converter for an incremental change in digital input.

4. A piezoresistive transducer as in claim 3 wherein said digital values for establishing the zero point of said transducer and the digital values for establishing the span of said transducer are determined empirically, and further including means to select related pairs of stored zero point and span data.

5. A piezoresistive transducer comprising in combination,
a bridge circuit with a pressure responsive piezoresistive element in at least one arm of said bridge, said bridge having a pair of output terminals;
a comparator having an input and an output;
means coupling said bridge output terminals to said comparator input;
said comparator output having one characteristic state when the potential of one bridge terminal is greater than the other and another characteristic state when it is less than that of the other;
means responsive to said comparator output to generate a series of digital values;
feedback means for coupling said digital values to said bridge to drive said bridge to balance,
means to store a set of digital values for establishing a zero point for said transducer;
means to store a set of digital values for establishing a span for said transducer;
means to couple zero point values to said bridge to establish a potential of one of said bridge output terminals relative to the potential of the other;
means to couple said span values to said bridge to establish the span of said transducer.

6. A piezoresistive transducer as in claim 5 wherein said digital values for establishing the zero point of said transducer and the digital values for establishing the span of said transducer are determined empirically, and further including means to select related pairs of stored zero point and span data.

7. A piezoresistive transducer comprising in combination,
a bridge circuit with a pressure responsive piezoresistive element in at least one arm of said bridge, said bridge having a pair of output terminals;
a comparator having an input and an output;
means coupling said bridge output terminals to said comparator input;
said comparator output having one characteristic state when the potential of one bridge terminal is greater than the other and another characteristic state when it is less than that of the other;
means responsive to said comparator output to generate a series of digital values;
feedback means for coupling said digital values to said bridge to drive said bridge to balance,
means to store a set of digital values for establishing a span for said transducer;
means to couple said span values to said bridge to establish the span of said transducer.

8. A piezoresistive transducer comprising in combination,
a bridge circuit with a pressure responsive piezoresistive element in at least one arm of said bridge, said bridge having a pair of output terminals;
a comparator having an input and an output;
means coupling said bridge output terminals to said comparator input;

said comparator output having one characteristic state when the potential of one bridge terminal is greater than the other and another characteristic state when it is less than that of the other;

means responsive to said comparator output to generate a series of digital values;

feedback means for coupling said digital values to said bridge to drive said bridge to balance, said feedback means including a feedback digital to analog converter;

said feedback converter having a reference potential input the magnitude of which determines the magnitude of incremental change in analog output for an incremental change in digital input;

means to store a set of digital values for establishing a span for said transducer;

means including a digital to analog converter to couple said span values to said feedback converter reference potential input to establish an incremental change in analog output of said feedback converter for an incremental change in digital input.

* * * * *